(12) United States Patent
Wang

(10) Patent No.: US 6,863,958 B2
(45) Date of Patent: Mar. 8, 2005

(54) CUSHIONING MEANS

(76) Inventor: Swei Mu Wang, No. 3, Lane 229, Daya Rd., Daya Shiang, Taichung (TW), 428

( * ) Notice: Subject to any disclaimer, the term of this patent is extended or adjusted under 35 U.S.C. 154(b) by 176 days.

(21) Appl. No.: 10/287,518

(22) Filed: Nov. 5, 2002

(65) Prior Publication Data

US 2004/0086681 A1 May 6, 2004

(51) Int. Cl.[7] .............................. B32B 3/12; B32B 3/20
(52) U.S. Cl. ........................................ 428/178; 428/188
(58) Field of Search ............................ 428/178, 188; 5/655.5, 654, 644; 36/43, 44, 28, 29, 35 R, 35 B; D2/961

(56) References Cited

U.S. PATENT DOCUMENTS

| | | | | |
|---|---|---|---|---|
| 4,345,387 A | * | 8/1982 | Daswick | 36/43 |
| 5,067,255 A | * | 11/1991 | Hutcheson | 36/43 |
| 5,131,174 A | * | 7/1992 | Drew et al. | 36/35 B |
| 5,167,999 A | * | 12/1992 | Wang | 428/178 |

* cited by examiner

*Primary Examiner*—Harold Pyon
*Assistant Examiner*—Catherine A. Simone
(74) *Attorney, Agent, or Firm*—Charles E. Baxley

(57) ABSTRACT

A cushioning means, which contains a substrate sheet, bouncing cells made of elastic material convexly formed on one side of the substrate sheet, supporting cells made of elastic material convexly formed on the other side of the substrate sheet, each the supporting cell having a passage connected to the corresponding bouncing cell, and a liquid article such as water take part of the space between the surfaces of the bouncing cells and supporting cells. Since the space is not full of the liquid, an air chamber is formed in the bouncing cells. The cushioning means utilizes the low density and high compressible nature of air collaborating with the flowing nature of liquid for the comfortable and effective cushioning purposes.

9 Claims, 9 Drawing Sheets

CUSHIONING MEANS

TECHNICAL FIELD

This invention relates generally to a cushioning means for cushioning impact force and providing comfortable contact, in particular, to provide a cushioning means utilizing the low density and high compressible nature of air collaborating with the flowing nature of liquid to improve the comfort s and the effect of cushioning.

BACKGROUND OF THE INVENTION

A conventional packing sheet or cloth may be formed with a plurality of cells filled with air in each cell on a substrate film or sheet material. Such a cellular packing sheet may be used for packing articles in the sheet to prevent damage or breakage of the articles to be packed. However, if such a packing sheet with air cells formed on the sheet is used for cushioning device such as for serving as an insole used in a footwear or for cushioning a user's body for leaning, seating or wearing purpose, the air-filled cells may be easily broken to lose their cushioning effect. Besides, since the density of air is smaller than liquid and solid, the transformation of the air cell is fast and big when pressed. Therefore the air sheet is very soft and elastic, which may cause user feel uncomfortable when sitting or lying on it for a long time.

If a substrate sheet is formed with a plurality of protrusions on the sheet such as by integral molding of plastic processing, the protrusions may still have some hardness or rigidity to possibly stick a user to cause his or her pain when wearing, seating or leaning on such a sheet with protrusions formed thereon.

Another conventional design is to provide a cushioning device including a plurality of liquid cells encapsulated in a flexible substrate sheet wherein each liquid cell is filled with water therein and the cells are juxtapositionally disposed on the sheet so that a cellular sheet may serve as a cushioning device for a user's seating, leaning or wearing for comfortable and other cushioning purposes. When the force applied to the sheet with liquid cells is comparatively slow and equally like sitting or lying on the sheet, the sheet can provide a comfortable support. However when the force applied on the sheet is sudden and concentrated like running or jumping on insoles made of the sheet, the sheet cannot absorb the impact force immediately and the user will feel that the insoles are too hard.

Therefore a cushioning means is needed, which can make users not only feel comfortable when using the cushioning means in different situations but also can effectively absorb the force applied on the means.

SUMMARY OF INVENTION

It is therefore primary objective of the present invention to provide a cushioning means can cushion force not only effectively but also comfortably in different situations.

Another object of the invention is to provide a cushioning means with a function of smooth massaging.

The present invention, briefly summarized, in one embodiment discloses a cushioning means, which contains a substrate sheet, plurality of bouncing cells made of elastic material convexly formed on one side of the substrate sheet, plurality of supporting cells made of elastic material convexly correspondingly formed on the other side of the substrate sheet, each the supporting cell having a passage connected to the corresponding bouncing cell, the plurality of supporting cells having connecting channels connected to nearby supporting cells and a liquid article filled in part of a space defined by the bouncing cells and the supporting cells, thereby air chambers are formed within the bouncing cells. The connecting channels between the supporting cells are selectable. When there are no connecting channels, each bouncing cell and corresponding supporting acts like an independent unit, which can also be made removable to be plugged into a base sheet.

BRIEF DESCRIPTION OF DRAWINGS

The invention will be more clearly understood after refer to the following detailed description read in conjunction with the drawings wherein.

DETAILED DESCRIPTION OF PREFERRED EMBODIMENTS

Figure 1:
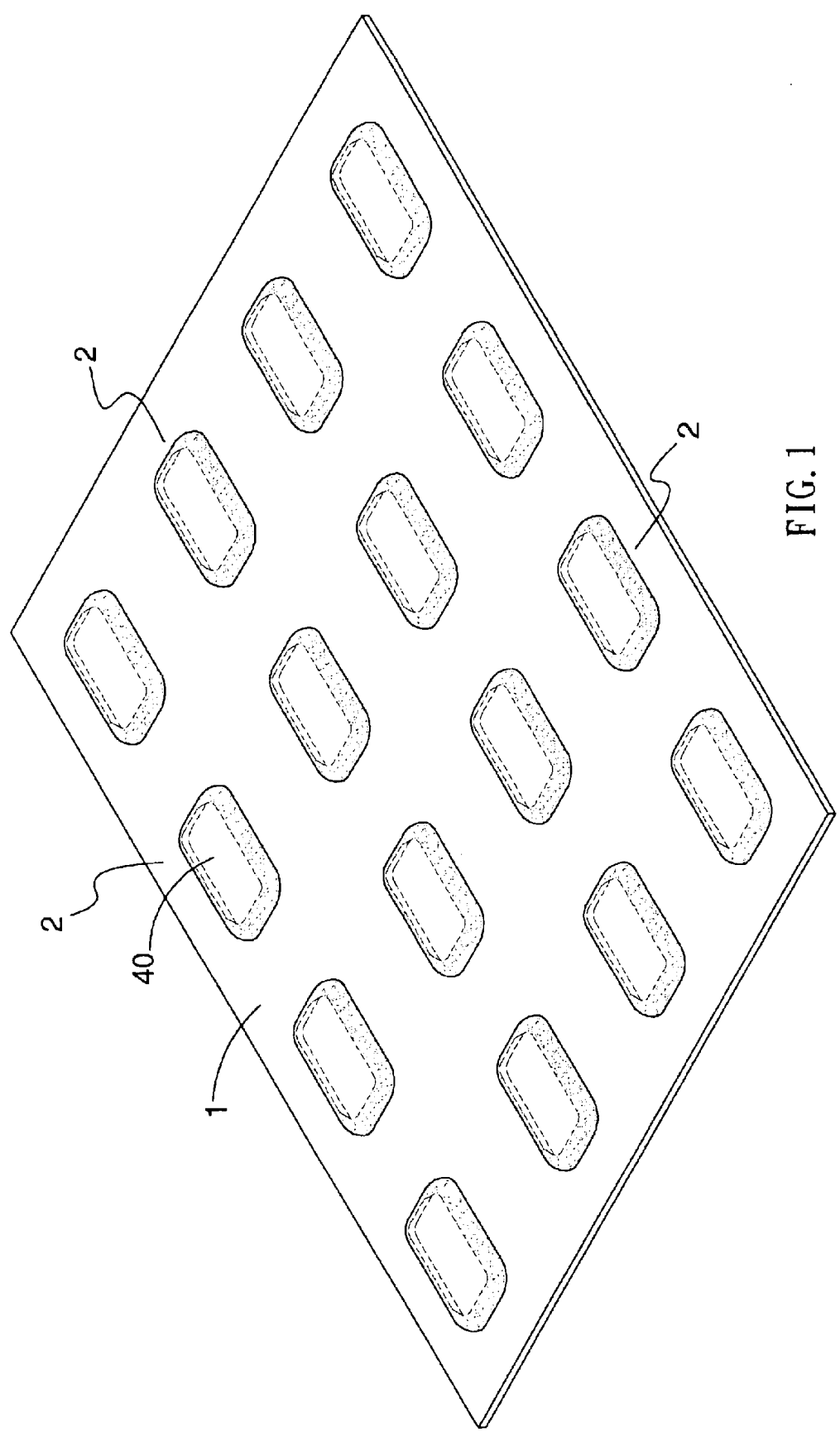
FIG. 1 is a perspective top view of an embodiment.
Figure 2:
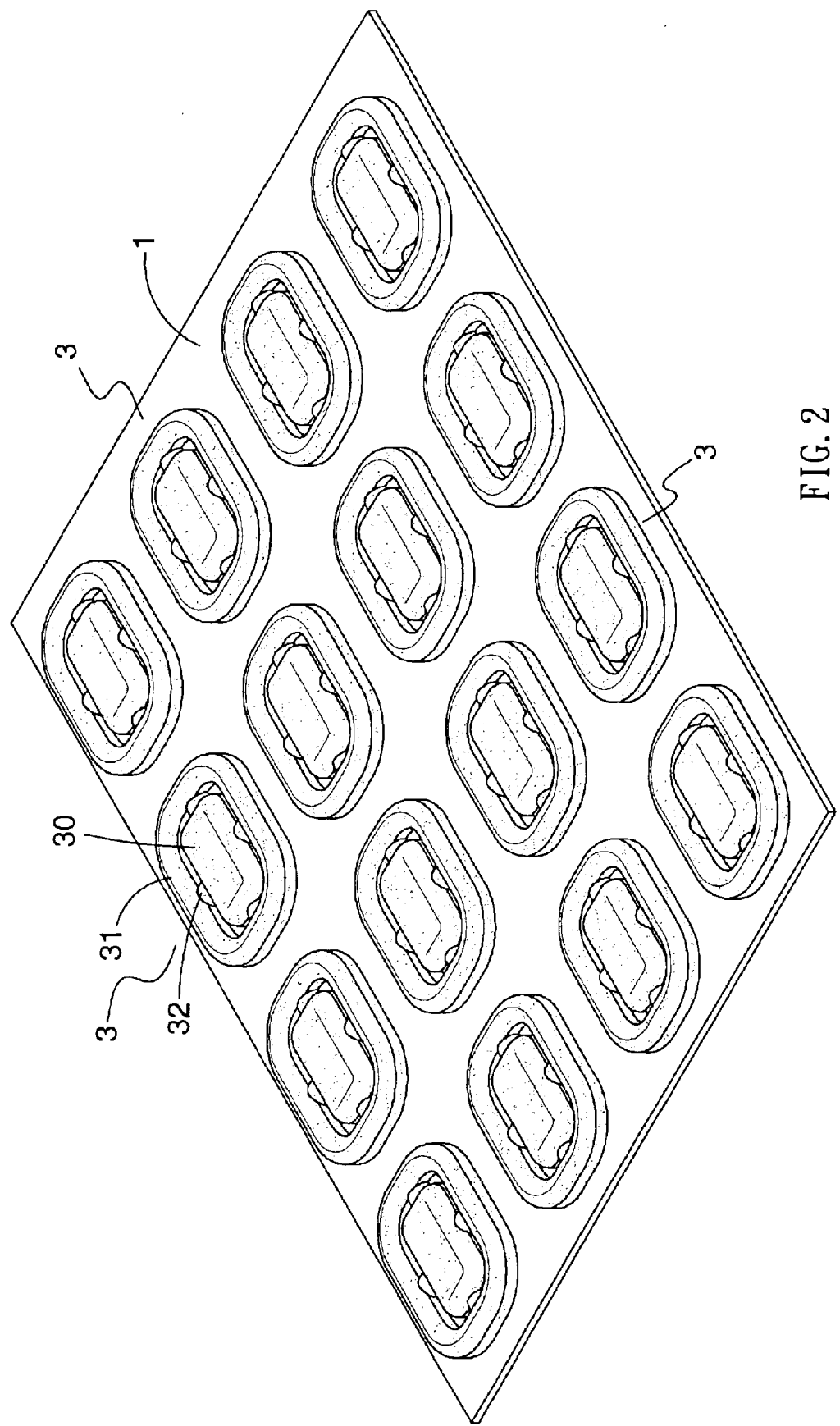
FIG. 2 is a perspective bottom view of an embodiment.
Figure 3:
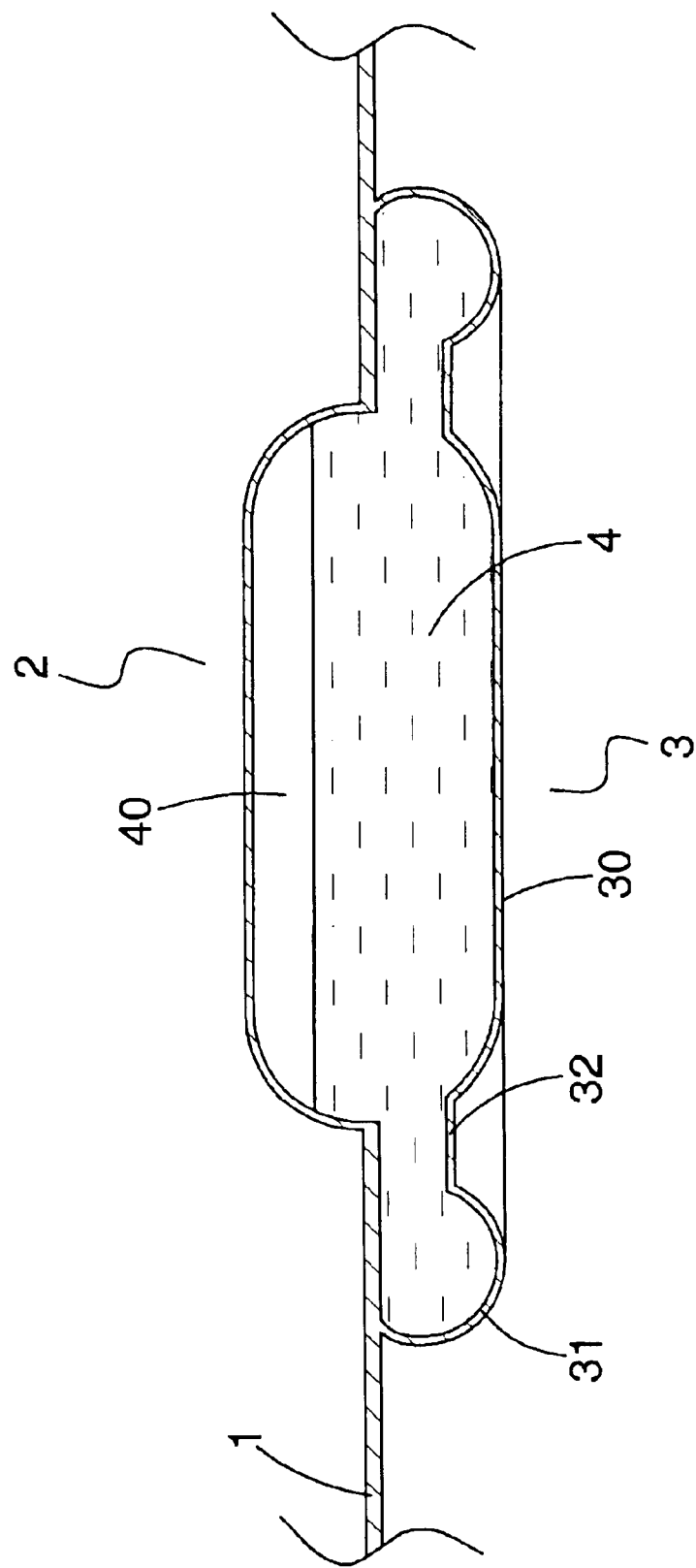
FIG. 3 is a cross section view of an embodiment.

With reference to FIG. 1 to FIG. 3 of the drawings, an embodiment of the invention is a cushioning means, which contains a substrate sheet 1, bouncing cells 2 made of elastic material convexly formed on one side of the substrate sheet 1, supporting cells 3 made of elastic material convexly formed on the other side of the substrate sheet 1, each the supporting cell having a passage connected to the corresponding bouncing cell 2, and a liquid article 4 filled in part of a space defined by the bouncing cells 2 and the supporting cells 3, thereby air chambers 40 is formed within the bouncing cells 2.

The bouncing cells 2 are juxtapositionally formed on the substrate sheet 1. The side of the cushioning means with bouncing cells 2 is for the purpose of human physical contacts. The substrate sheet is preferably flexible.

Each supporting cell 3 contains a main supporting cell 30 connected to the bouncing cell 2 with the passage; and an auxiliary supporting cell 31 connected to the main supporting cell with at least one channel 32. The liquid article 4 is not limited in this invention, and is preferably selected from water. The shape of each bouncing cell 2 and supporting cell 3 is not limited in this invention, which can be circular, oval, rectangular, conical, short strip or long strip or any other shapes or structures regular or irregular.

With reference to FIG. 3 of the drawings, when the cushioning means is pressed, the convexly formed bouncing cells 2 stand the pressure first. Since the moment the pressure is applied on the bouncing cells 2, the liquid article 4 cannot cushion the pressure transferred by the air in the air chamber 40 immediately because of the low compressible nature of liquid. Therefore the air chamber 40 is functioned as an air pad and stands most of the pressure. When the pressure is applied on the cushioning means, the pressure causes the liquid article 4 inside the cushioning means to flow. The flow of the liquid article 4 relieves the pressure in the air chamber 40 and helps the pressure uniformly distributed. The flow of the liquid article 4 also make the reacting force applied back to human bodies through the convexly formed bouncing cells 2 gently and uniformly and therefore the massage effect through the convexly formed bouncing cells 2 on human bodies is gentle and can avoid physical harm.

Figure 4:
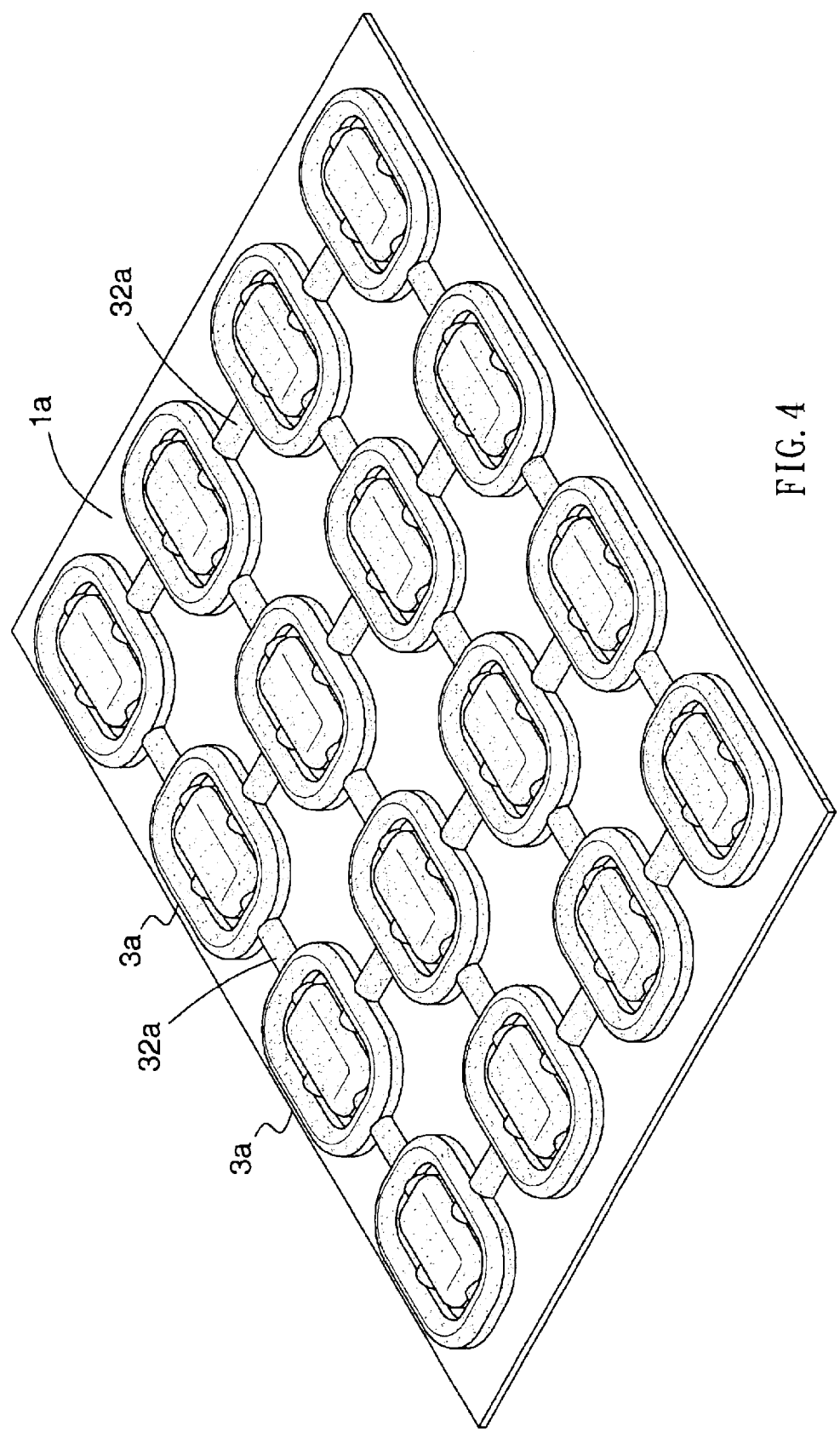
FIG. 4 is a perspective bottom view with connecting channels of an embodiment.

With reference to FIG. 4, another embodiment of the invention is of the same structure as the embodiment in FIG. 1 to FIG. 3 and further contains connecting channels 32a between the supporting cells 3a on the substrate sheet 1a. When a pressure such as a weight of a human body is applied on the cushioning means, the pressure will cause the liquid article 4 in the pressured supporting cells flows to other not pressed supporting cells 3a. Therefore the pressure will be taken by all the supporting cells 3a. The flow of the liquid article 4 between different supporting cells 3a have a massage effect on human bodies.

When utilizing the invention on different applications, we can choose different ratio of the liquid article 4 and the air in the air chamber 40 to satisfy different needs. The more space the liquid article 4 takes between the space defined by the bouncing cells 2 and supporting cells 3, the harder the cushioning means is. For example when using the invention on sporting shoes insoles, we can make a design that the liquid article 4 takes ⅓ of the total space to make it softer to absorb sudden impacts. When the invention is applied on a seat cushion, we can make a design that the liquid article 4 takes ⅔ of the total space to make the cushioning means not too soft.

Figure 5:
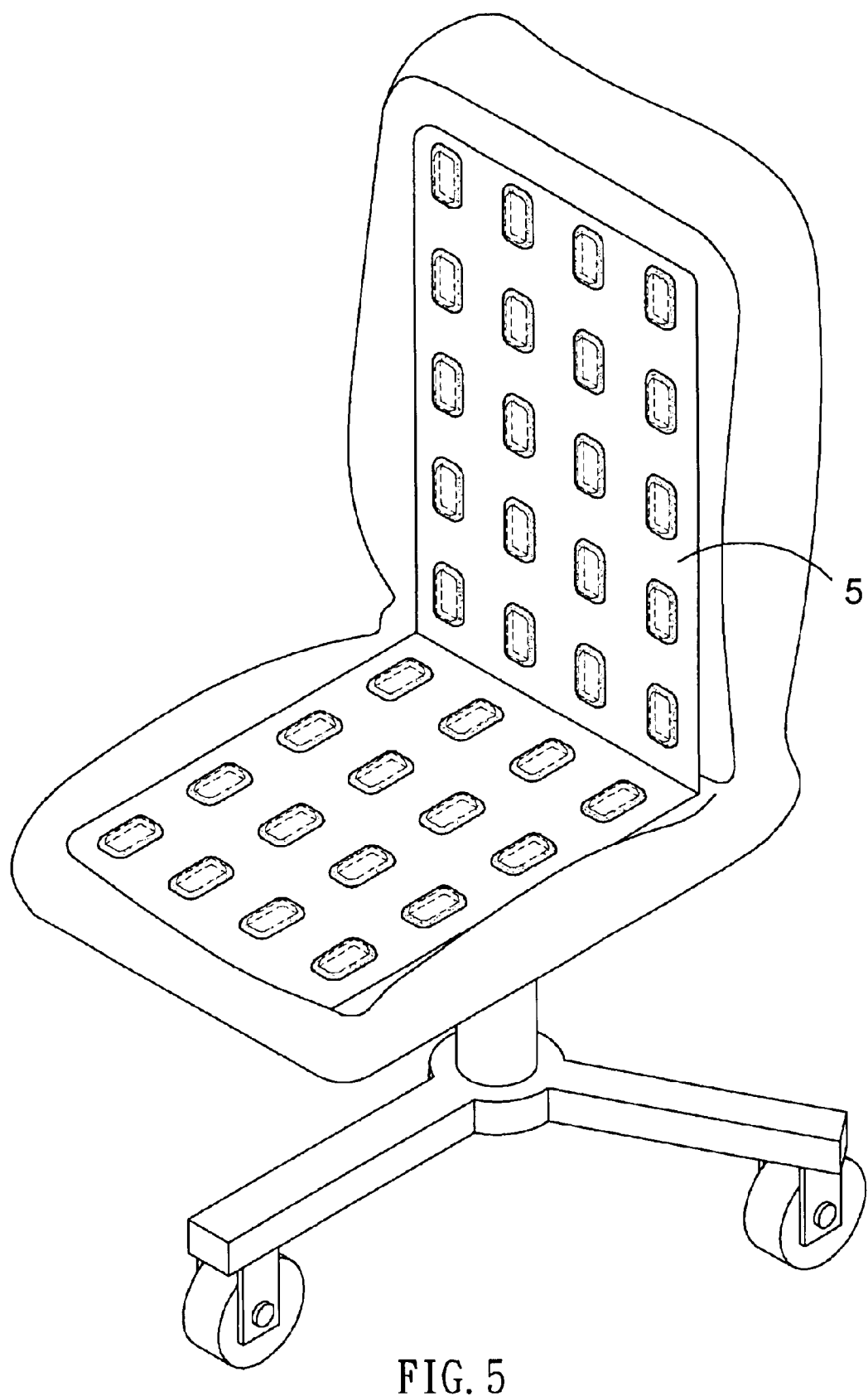
FIG. 5 is a perspective view showing an application of an embodiment as a seat cushion.
Figure 6:
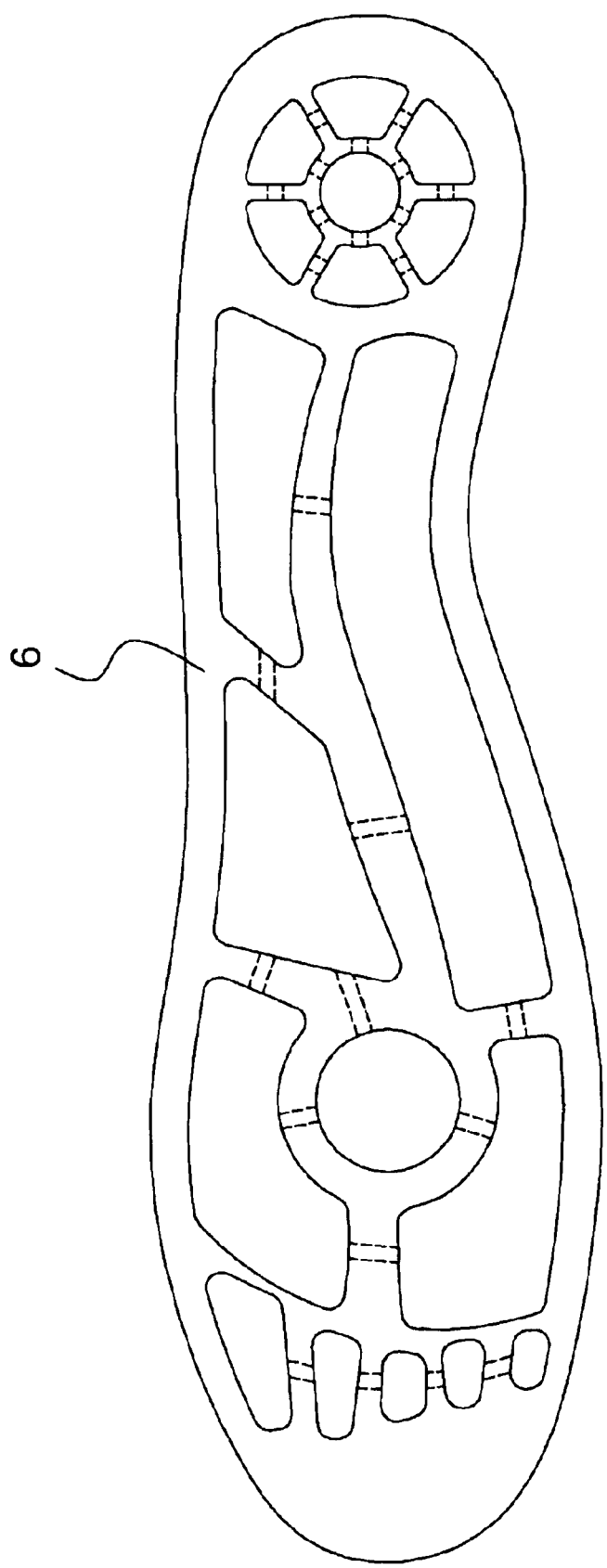
FIG. 6 is a perspective view showing an application of an embodiment as a insole.
Figure 7:
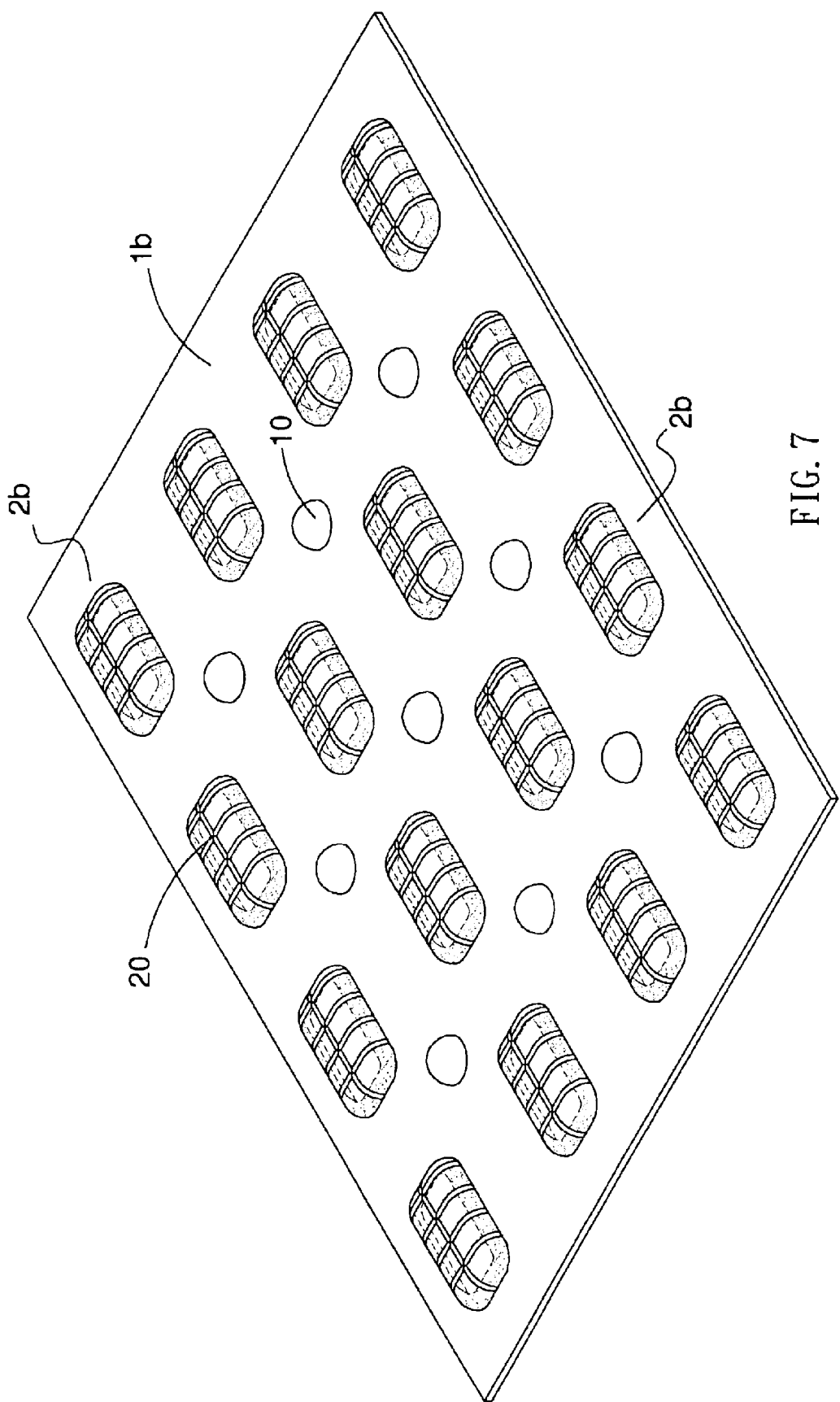
FIG. 7 is a perspective top view of an embodiment having protrusions thereon.

With reference to FIG. 5 and FIG. 6, the present invention can be used as a seat cushion 5 and insole 6. With reference to FIG. 7, on the surfaces of the substrate sheet 1b and bouncing cells 2b can have protrusions thereon such as protruding knobs 10 and protruding lines 20 for the purpose of human body massage.

Figure 8:
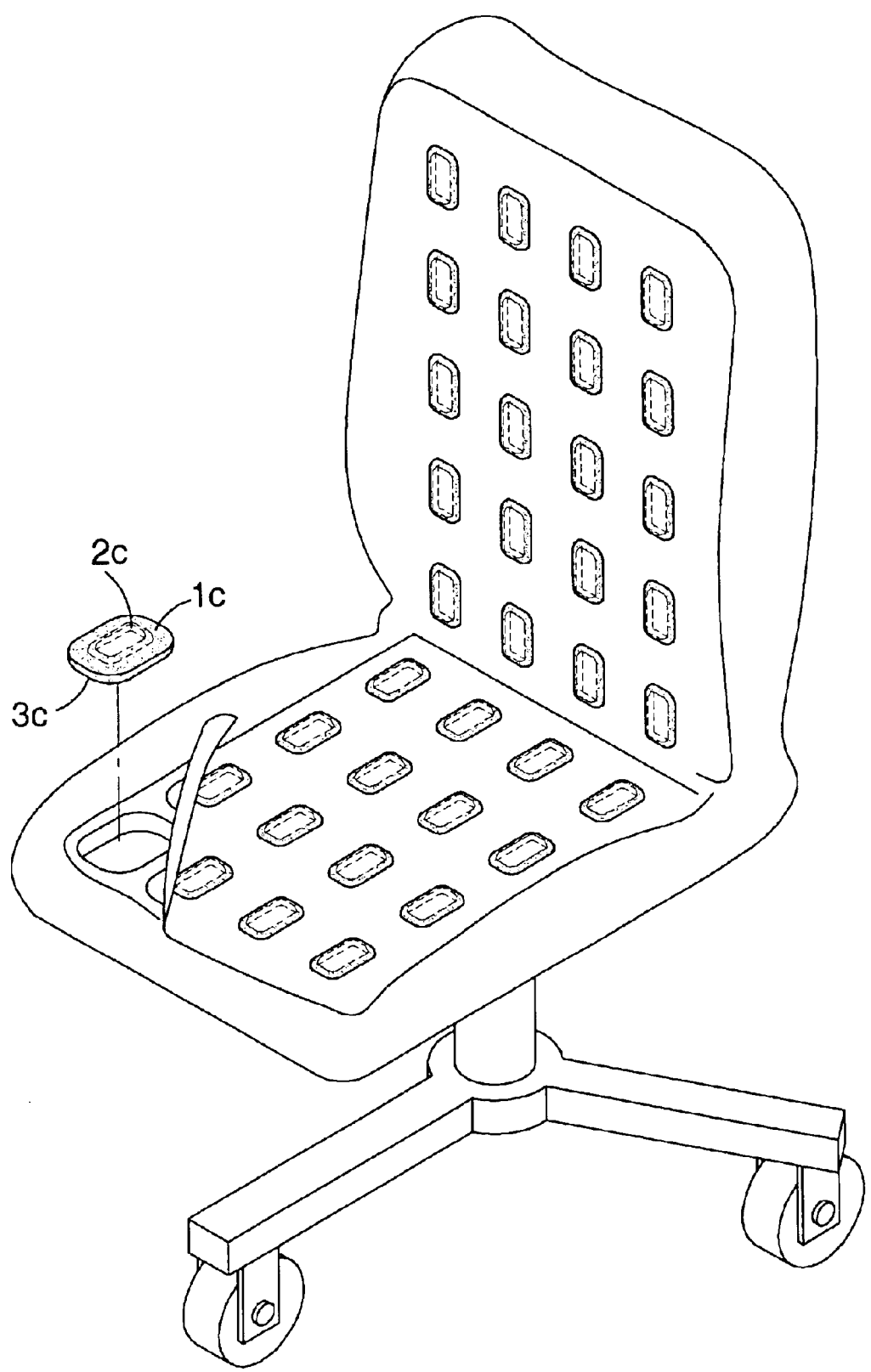
FIG. 8 is a perspective view showing an application of an embodiment as a single unit form to be plugged into a sitting pad structure.
Figure 9:
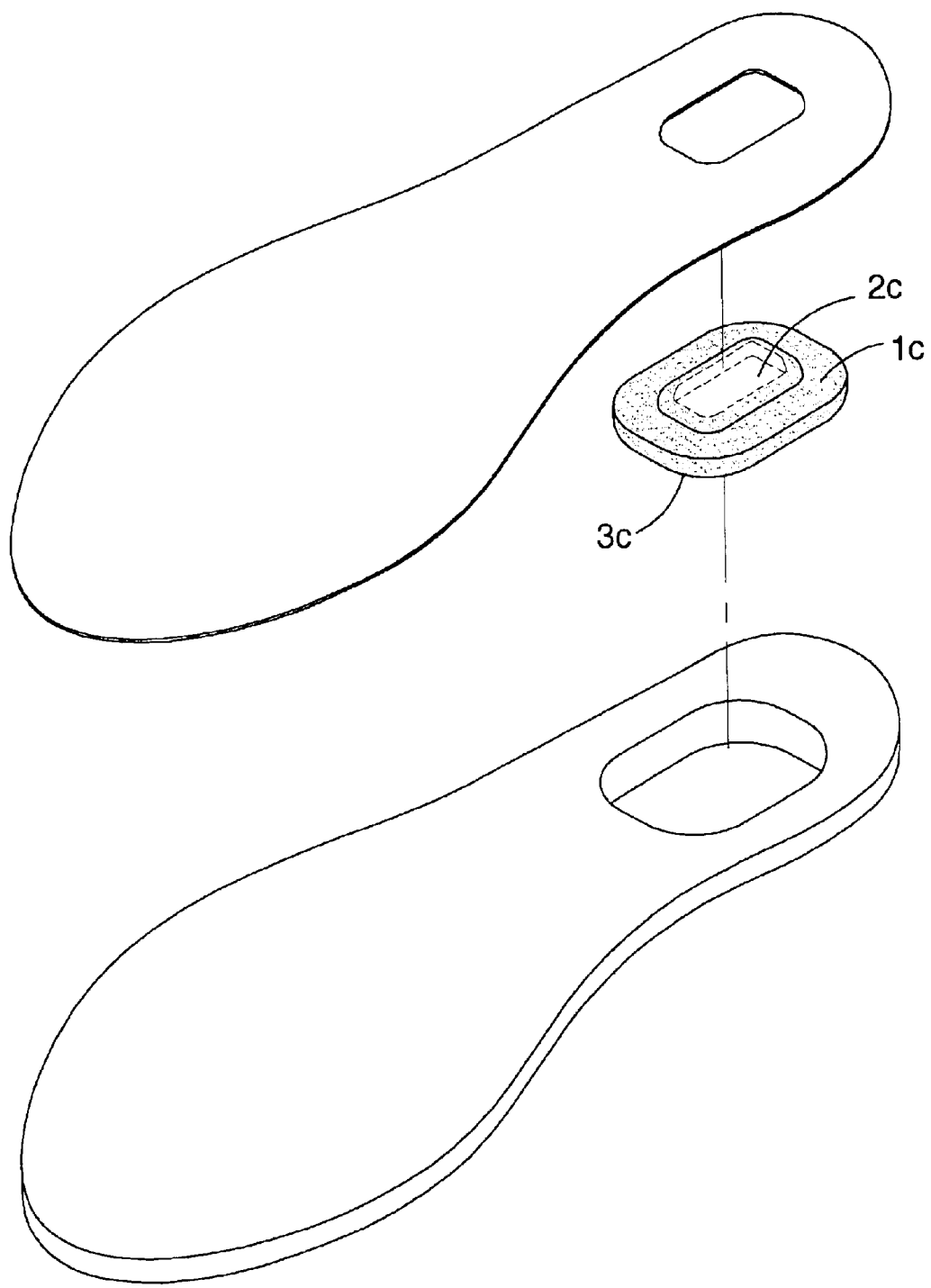
FIG. 9 is a perspective view showing an application of an embodiment as a single unit form to be plugged into an insole structure.

With reference to FIG. 8 and FIG. 9, the further embodiment of the invention is to make the cushioning means as a single unit form, which can be inserted to a sheet structures like a insole or seat cushion. The benefit of this embodiment is that when one of the cushioning means is damaged, it can be replaced individually.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

I claim:

1. A cushioning means comprising:

a substrate sheet;

a bouncing cell made of elastic material convexly formed on one side of said, substrate sheet;

a supporting cell made of elastic material convexly formed on the other side of said substrate sheet, said supporting cell including a main supporting cell, and including a passage connecting said main supporting cell to said bouncing cell, and including an auxiliary supporting cell surrounding said main supporting cell and connected to said main supporting cell with at least one channel, and a liquid article filled in part of a space defined by said bouncing cell and said supporting cell, thereby an air chamber is formed within said bouncing cell.

2. The cushioning means of claim 1, wherein said liquid article takes about ⅓ to ⅔ of said space.

3. The cushioning means of claim 1, wherein said substrate sheet and bouncing cell have protrusions thereon.

4. The cushioning means of claim 1, wherein said liquid article is water.

5. A cushioning means comprising:

a substrate sheet;

a plurality of bouncing cells made of elastic material convexly formed on one side of said substrate sheet;

a plurality of supporting cells made of elastic material convexly correspondingly formed on the other side of said substrate sheet, each said supporting cell including a main supporting cell connected to said bouncing cell with said passage and including an auxiliary supporting cell surrounding each corresponding main supporting cell, each said auxiliary supporting cell being connected to said corresponding main supporting cell with at least one channel, and a liquid article filled in part of a space defined by said bouncing cells and said supporting cells, thereby air chambers are formed within said bouncing cells.

6. The cushioning means of claim 5, wherein said liquid article takes about ⅓ to ⅔ of said space.

7. The cushioning means of claim 5, wherein said substrate sheet and bouncing cells have protrusions thereon.

8. The cushioning means of claim 5, wherein said liquid article is water.

9. The cushioning means of claim 5, wherein said substrate sheet includes a plurality of connecting channels connected between said supporting cells.

* * * * *